May 2, 1939.  L. C. DOANE  2,156,621
VEHICLE LIGHTING FIXTURE
Filed May 3, 1937   4 Sheets-Sheet 1
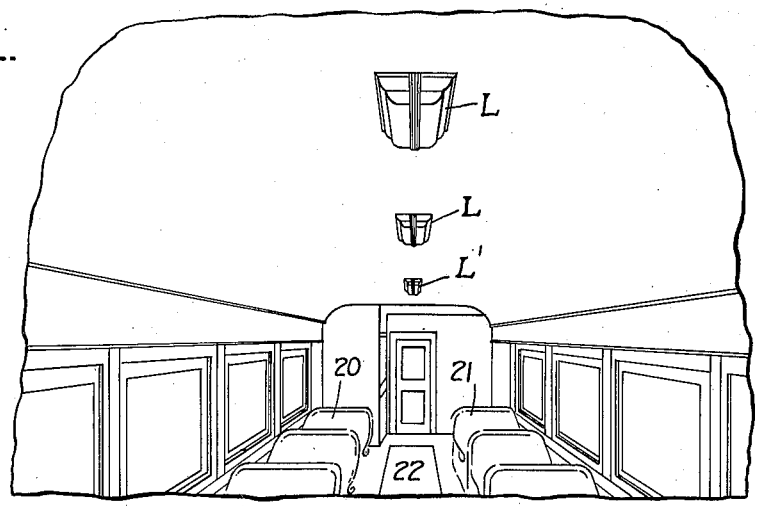
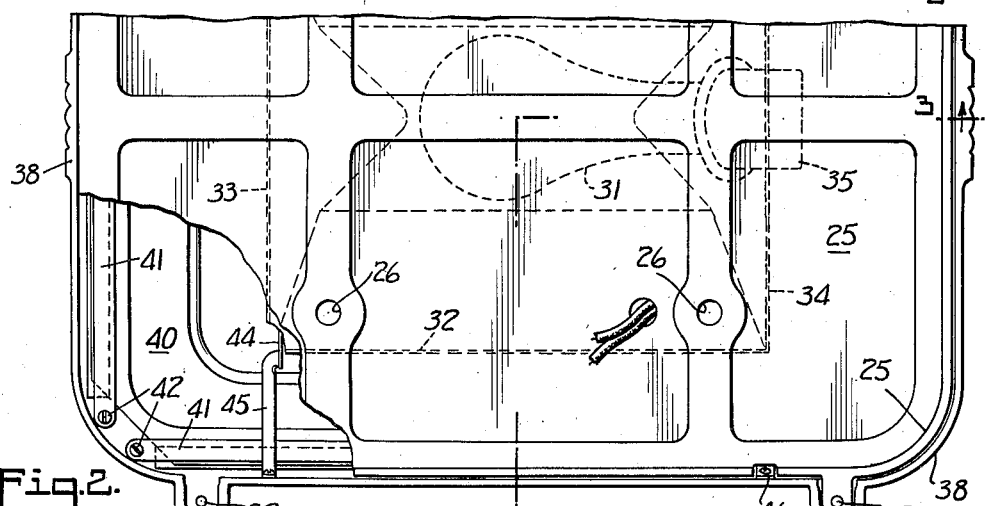
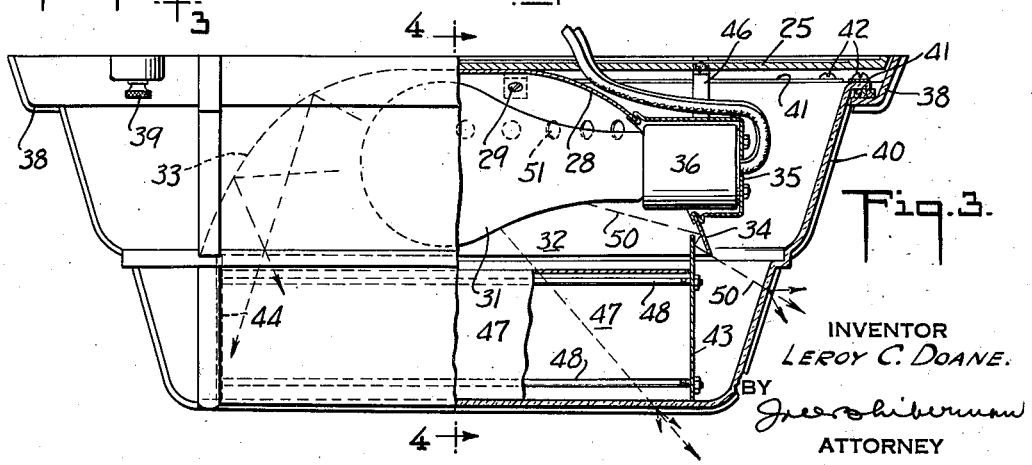
INVENTOR
LEROY C. DOANE.
BY
ATTORNEY May 2, 1939.  L. C. DOANE  2,156,621
VEHICLE LIGHTING FIXTURE
Filed May 3, 1937  4 Sheets-Sheet 2
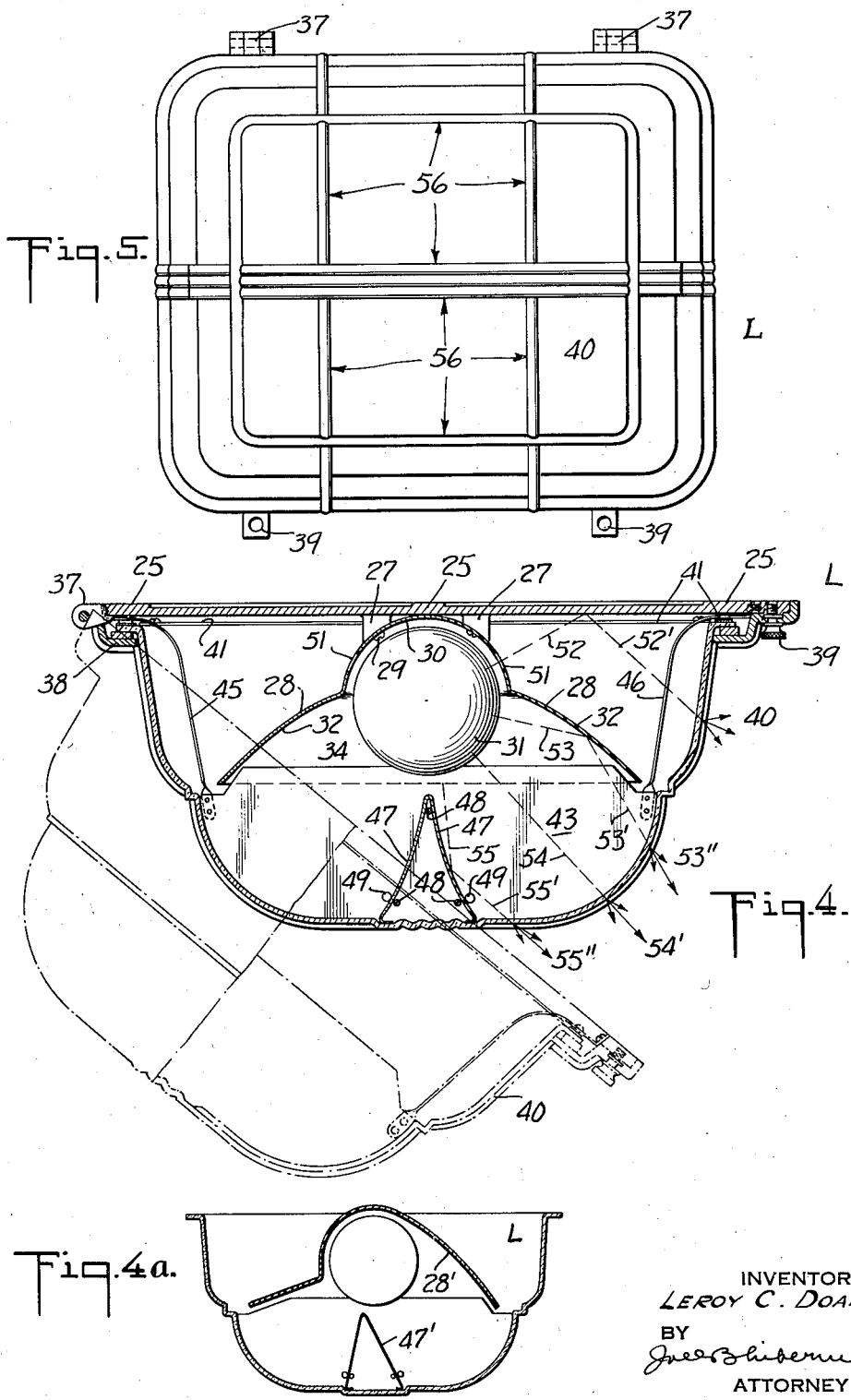
INVENTOR
LEROY C. DOANE.
BY
ATTORNEY May 2, 1939.  L. C. DOANE  2,156,621
VEHICLE LIGHTING FIXTURE
Filed May 3, 1937   4 Sheets-Sheet 3
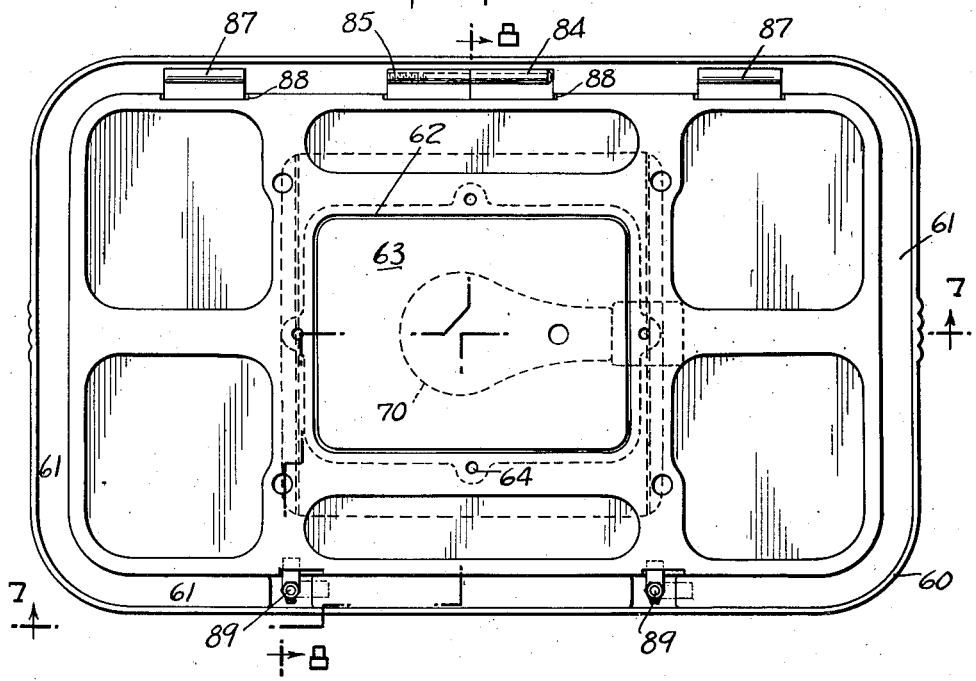
Fig. 6.
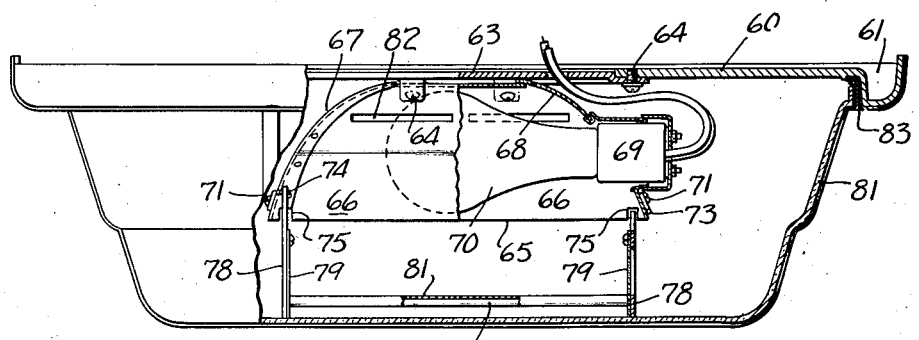
Fig. 7.
Fig. 8a.
INVENTOR
LEROY C. DOANE
BY
ATTORNEY May 2, 1939.  L. C. DOANE  2,156,621
VEHICLE LIGHTING FIXTURE
Filed May 3, 1937  4 Sheets-Sheet 4

INVENTOR
LEROY C. DOANE.
BY
ATTORNEY

Patented May 2, 1939

2,156,621

UNITED STATES PATENT OFFICE 2,156,621

VEHICLE LIGHTING FIXTURE

Leroy C. Doane, Meriden, Conn., assignor to The Miller Company, Meriden, Conn., a corporation of Connecticut Application May 3, 1937, Serial No. 140,419

13 Claims. (Cl. 240—7.35)

The present invention relates to lighting fixtures for vehicles, and is more particularly directed toward lighting fixtures adapted to be mounted at the ceiling of railway cars or buses and over the aisle.

The present invention contemplates lighting fixtures for this purpose which are totally enclosed to keep out dirt and dust, and which have a diffusing enclosure made out of material having but slight diffusion so as to effect directional transmission of the light rays from the light source and from a superposed reflector. The lighting unit is mounted so as to have its axis longitudinal of the vehicle, and is designed to project the more intense light rays out at such angles to the median plane of the car as to build up the illumination in the region of the car seats. The units contemplated herein are adapted for spaced mounting along the ceiling of the car, and each unit affords sufficient light spread longitudinally of the car to cover a number of seats on each side of the aisle.

The present invention also contemplates lighting fixtures for this purpose which are provided with centrally disposed light intercepting devices to cut off longitudinally projected light in the region of the aisles.

Where the entire fixture is mounted below the ceiling of the car the present invention contemplates provisions whereby portions of the enclosing bowl through which the dominant light rays are projected shall be illuminated to a low degree.

Other and further objects will appear as the description proceeds.

The accompanying drawings show, for purposes of illustrating the present invention, several embodiments in which the invention may take form, it being understood that the drawings are illustrative of the invention rather than limiting the same.

In these drawings:

Figure 1 is a perspective view through a railway coach illustrating the mounting of the units;

Figure 2 is a top plan view of one form of lighting unit with parts broken away to show interior construction;

Figure 3 is a vertical longitudinal sectional view taken on the broken line 3—3 of Figure 2;

Figure 4 is a vertical transverse section taken on the line 4—4 of Figure 3;

Figure 4a is a fragmentary view illustrating the arrangement of reflectors for a slightly modified form of construction;

Figure 5 is an inverted plan view of the fixtures shown in Figures 1 to 4;

Figure 6 is a top plan view of the modified form of construction;

Figure 7 is a longitudinal sectional view taken on the broken line 7—7 of Figure 6;

Figure 8a is a fragmentary top plan view of a detail;

Figure 1 illustrates a conventional railway coach having rows of seats 20, 21 separated by an aisle 22. A plurality of lighting units L is mounted in the ceiling of the car over the aisle, and these lighting units are, as above stated, designed to build up an illumination in the region occupied by the car seats and passengers.

Figure 8:
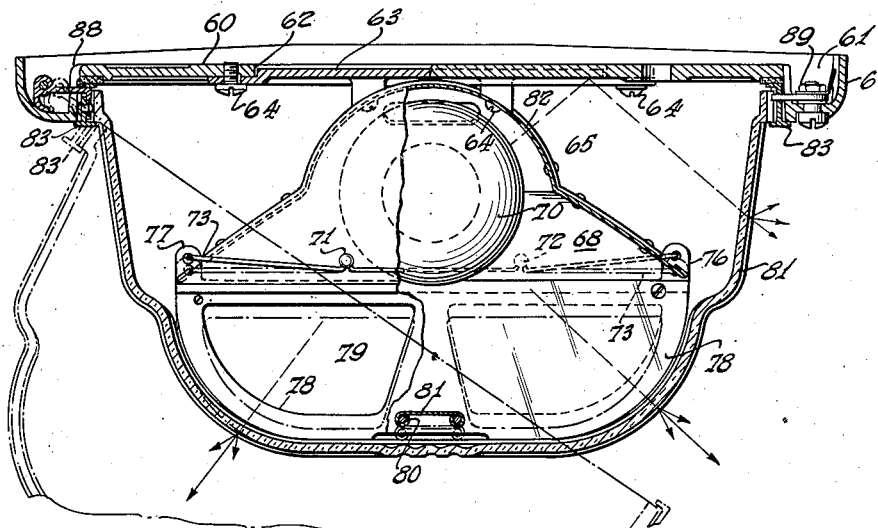
Figure 8 is a transverse sectional view taken on the broken line 8—8 of Figure 6.

In the construction shown in Figures 2 to 5, the fixture employs a supporting plate 25 adapted to be secured to the ceiling of the car by bolts extending through holes indicated at 26. This plate is preferably a casting and has near the center downwardly extending lugs 27 to which a reflector 28 is secured by means of screws 29.

The reflector is an elongated trough shaped device here shown as having a substantially cylindrical portion 30 directly above the lamp bulb 31 and longitudinally extending widely flaring portions 32. The ends of the reflector, indicated at 33 and 34, are preferably curved, as shown, and extend down to the same level as the edges of the reflector portions 32, so as to form a reflector having a rectangular mouth. The end 34 of the reflector supports a socket housing 35 in which is mounted a socket 36 to support the lamp bulb 31.

As shown in Figures 2 to 5, the plate 25 has hinge lugs 37 to which is secured a rectangular frame 38. The other side of this frame is provided with locking devices 39. The frame 38 supports a rectangular bowl 40, the bowl being clamped in place by straps 41 and screws 42. This bowl may be made out of pressed crystal glass which is etched or coated so as to have portions of different translucency as pointed out below.

Transversely extending metal screens 43 and 44 are supported from the frame 38 by means of springs 45 and 46 normally under compression to prevent rattling. The transverse screens support a longitudinally extending inverted V-shaped light deflector 47. The screens are bolted together by bolts indicated at 48 and the V-shaped deflector 47 held against spreading by projections 49 pressed out of the material of the plates. The screen plates 43 and 44 extend above the lower edge of the reflector 28, as will be apparent from Figures 3 and 4, so that some light may leak through the intervening space, as indicated by the light ray 50, 50'. A small amount of light is allowed to escape upwardly through holes 51, and this light is reflected downwardly, as indicated by the light ray 52, 52'. The portions of the bowl which are screened by the screens 43 and the reflector and against which dim light falls from the rays 50', 52', is heavily etched so that this part of the bowl will have a uniform low luminosity. The part of the bowl which is between the transverse screens 43 and 44 and below the reflector 28 is lightly etched, so as to be highly translucent and transmit the light without substantial change in the direction as indicated by the light rays 53, 53', 53'', 54, 54', 55, 55', 55''. In Figure 5 the more highly translucent areas of the bowl are indicated by the areas 56, 56 and conceal the interior construction.

The fixtures shown and described in Figures 2 to 5, inclusive, have low luminosity in all directions in which they are normally viewed by occupants of the seats, and at the same time direct intense lighting across the car so as to build up the intensity in the working plane in the region of the seats on the opposite sides of the aisle. The construction is symmetrical with respect to the axis of the fixture and builds up an equal amount of light on each side of the aisle. At the ends of the car the fixture L', indicated in Figure 1 and shown diagrammatically in Figure 4a, has a reflector 28' which is asymmetric in transverse planes and the light deflector 47 is also asymmetric. This fixture will build up the lighting on the side opposite the washroom.

In the fixtures shown in Figures 6 to 8, the supporting plate is shown at 60. It has a peripheral upwardly opening channel-like portion 61 and a central opening 62.

The opening 62 accommodates a reflector supporting plate 63 secured in place by screws indicated at 64, and this plate supports a reflector 65 having generally the same shape as the reflector 28 shown in Figures 2 to 4. It is made out of an inverted trough shaped piece of sheet metal 66 having the configuration shown in section in Figure 8, and two end members 67 and 68 riveted to it. The end member 68 supports the lamp socket 69 for the bulb 70.

The end members 67 and 68 are provided with spring anchorages 71 and 72 to which are secured transversely extending springs 73. The ends of these springs are bent toward one another, as indicated at 74, Figure 8a, and they normally overlie the corners of the reflector. These corners are slotted, as indicated at 75, to accommodate upwardly extending ears 76 and 77 carried by transversely extending skeletonized screen frames 78. The ends of the springs 73 enter holes in these skeletonized frames as shown, and the springs tend to press the screen frames downwardly. These screen frames 78 carry translucent plates of slightly diffusing plastic material 79 and are held together by bolts 80 and the longitudinally extending metal strip 81.

The reflector 65 and spring supported transverse screens form a unit which is supported from the plate 60. The diffusing bowl is indicated at 81. It is generally of the same nature as the bowl 40 and has highly translucent and more dense portions corresponding with those of bowl 40. The upper part of the bowl and ends of the bowl are illuminated by light rays passing through slots 82 in the reflector and by light passing through the screens 79.

The bowl 81 is secured in a split band 83 whose ends are held together by hinge lugs 84 and 85, indicated in Figure 6. These hinge lugs together with other hinge lugs 87 extend out through openings 88 in the side wall of the plate 60, and extend into the channel 61. Opposite the hinge mechanism, catch mechanism indicated generally at 89, is provided. This hinge and catch mechanism per se forms no part of the invention to which the present application is directed.

Figure 9:
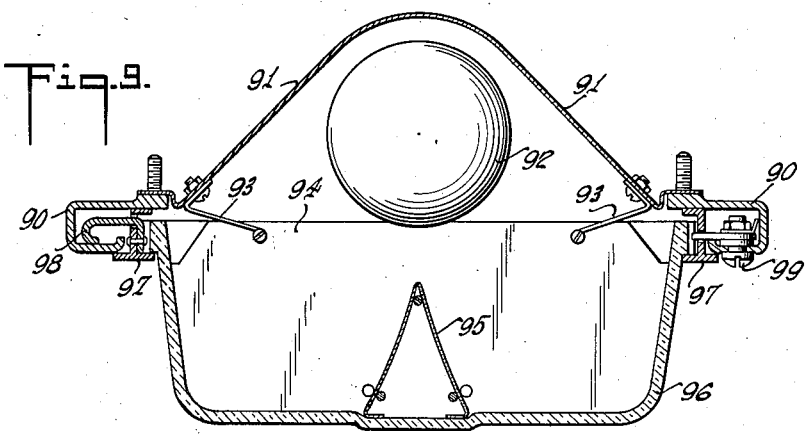
Figure 9 is a transverse sectional view through another form of construction adapted for recessed mounting in the ceiling.
Figure 10:
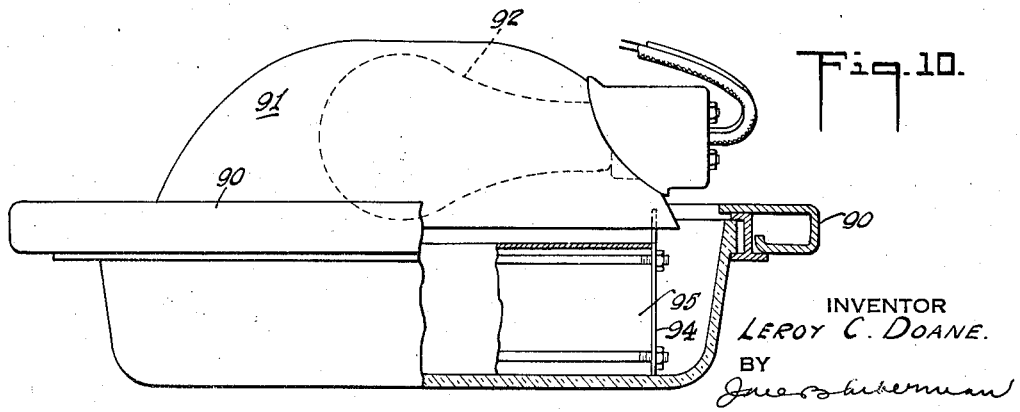
Figure 10 is a side elevational view of the same with parts in section.

The arrangement shown in Figures 9 and 10 is designed for recess mounting. Here the support for the fixture is in the form of an open frame 90. It supports a reflector 91 similar to the reflectors previously described but without holes for allowing light to leak upwardly. The reflector supports a lamp bulb indicated at 92, and is here shown as being provided with springs 93 to support transverse plates 94 interconnected by a light deflector 95 similar to the light deflector 47, shown in Figure 4. The highly translucent bowl 96 is secured in a band 97 similar to the band 83 of Figure 8, and this band is secured to the frame 90 by hinge and catch connections indicated generally at 98 and 99.

It is obvious that the invention may be embodied in many forms and constructions within the scope of the claims and I wish it to be understood that the particular forms shown are but a few of the many forms. Various modifications and changes being possible, I do not otherwise limit myself in any way with respect thereto.

What is claimed is:

1. A luminaire for railway car lighting comprising a light source, an elongated diffusing bowl below the light source and having a generally rectangular shaped bottom area and upwardly extending side walls each adapted for directional transmission of light and for concealing interior structures, an elongated reflector above the source and having its side walls extending substantially to the top of the highly translucent side walls of the bowl for directing light toward said bottom area and side walls with controlled spread transversely, the reflector having end walls to intercept high angled longitudinally directed light rays and reflect them toward the bottom of the bowl, transverse screens between the bottom of the bowl and the bottom edges of the end walls of the reflector for screening the ends of the bowl, and means to support the transverse screens independently of the bowl so that they remain in position when the bowl is lowered, said means including springs compressed when the bowl is in position so as to prevent rattling.

2. A luminaire for railway car lighting comprising a light source, an elongated diffusing bowl below the light source and having a generally rectangular shaped bottom area and upwardly extending side walls each adapted for directional transmission of light and for concealing interior structures, an elongated reflector above the source and having its side walls extending substantially to the top of the highly translucent side walls of the bowl for directing light toward said bottom area and side walls with controlled spread transversely, the reflector having end walls to intercept high angled longitudinally directed light rays and reflect them toward the bottom of the bowl, and transverse screens between the bottom of the bowl and the bottom edges of the end walls of the reflector for screening the ends of the bowl, the upper edges of the screens being above the lower edges of the ends of the reflector and spaced inwardly therefrom whereby a small amount of light may escape to illuminate the end portions of the bowl.

3. A lighting fixture comprising a plate adapted to be mounted on the ceiling of a railway car over the aisle, a lamp, a translucent enclosing bowl, a bowl supporting frame detachably secured to the plate, a reflector between the lamp and plate, the reflector being elongated in the direction of the car aisle and extending below the lamp at the sides and ends to screen the upper peripheral portion of the bowl and shaped to project the reflected rays into a widely divergent beam to cover the car seats on the opposite sides of the aisle, and transverse vertical screens extending from adjacent the ends of the reflector to the bottom of the bowl to limit the spread of light longitudinally of the fixture, the translucency of the bottom of the bowl on which the direct and reflected rays fall being high to conceal the bulb and reflector and effect directional transmission of light toward the seats, the upper edges of the screens being above the lower edges of the ends of the reflector and spaced inwardly therefrom whereby a small amount of light may escape to illuminate the end portions of the bowl, the reflectors having small openings to allow the escape of light to illuminate the upper side walls of the bowl.

4. A lighting fixture comprising a plate adapted to be mounted on the ceiling of a railway car over the aisle, a lamp, a translucent enclosing bowl, a bowl supporting frame detachably secured to the plate, a reflector between the lamp and plate, the reflector being elongated in the direction of the car aisle and extending below the lamp at the sides and ends to screen the upper peripheral portion of the bowl and shaped to project the reflected rays into a widely divergent beam to cover the car seats on the opposite sides of the aisle, transverse vertical screens extending from adjacent the ends of the reflector to the bottom of the bowl to limit the spread of light longitudinally of the fixture, the translucency of the bottom of the bowl on which the direct and reflected rays fall being high to conceal the bulb and reflector and effect directional transmission of light toward the seats, and screen supporting springs for pressing the screens against the bowl to prevent rattling.

5. A bowl for railway car lighting fixtures, said bowl having a generally rectangular shaped upper edge, a generally rectangular shaped, substantially flat bottom and upwardly and outwardly diverging side and end walls extending to said edge, and end walls and the upper portions of the side walls being dense and highly diffusing, the bottom and the lower portions of the side walls being slightly diffusing to effect directional transmission of light.

6. A luminaire for railway car lighting comprising a light source, an elongated diffusing bowl below the light source and having a generally rectangular shaped bottom area and upwardly extending side walls adapted for directional transmission of light and for concealing interior structures, an elongated reflector above the source and having its side walls extending substantially to the top of the highly translucent side walls of the bowl for directing light toward said bottom area and side walls with controlled spread transversely, the reflector having end walls to intercept high angled longitudinally directed light rays and reflect them toward the bottom of the bowl, depending skeleton frames supported from the ends of the reflector, and translucent screens supported from the skeleton frames for screening the ends of the bowl.

7. A luminaire such as claimed in claim 6, wherein the support for the skeleton frames includes springs which are compressed when the bowl is in position.

8. In a luminaire, an inverted trough shaped reflector having upwardly and inwardly convergent transverse ends, a lamp socket and lamp bulb, the bulb being below the reflector, a screen frame including end members yieldably carried by the ends of the reflector, transverse screens carried by the frame, and a diffusing bowl into which the screen members extend.

9. A luminaire such as claimed in claim 8, having a longitudinally extending light intercepting screen between the transverse screens to reduce the intensity of illumination below the luminaire.

10. In a luminaire, an inverted trough shaped reflector having upwardly and inwardly convergent transverse ends, a lamp socket and lamp bulb, the bulb being below the reflector, a screen frame including end members yieldably carried by the ends of the reflector, transverse diffusing screens carried by the frame, and a diffusing bowl into which the screen members extend.

11. A railway car lighting fixture comprising a ceiling plate having a reflecting lower surface, a rectangular bowl supporting frame detachably secured to the plate, a bowl having a generally rectangular shaped upper edge secured to the frame, a generally rectangular shaped flat bottom, and upwardly and outwardly diverging side and end walls extending to said edge, the end walls and the upper portions of the side walls being dense and highly diffusing, the bottom and the lower portions of the side walls being slightly diffusing to effect directional transmission of light, transversely disposed screens extending upwardly from the ends of the slightly diffusing bottom of the bowl to substantially the height of the slightly diffusing portions of the side walls, a centrally disposed light source, and an elongated downwardly acting reflector extending downwardly about the light source and adapted to produce a beam widely divergent in transverse planes, the sides of the reflector terminating adjacent the upper edge of the slightly diffusing portions of the side walls, the ends of the reflector extending down adjacent the upper edges of the screens, the screens screening the lower portions of the end walls of the bowl and limiting the longitudinal spread of direct and reflected light, the reflector having windows to allow upward escape of light toward the plate for redistribution thereby to illuminate the upper part of the bowl.

12. A railway car lighting fixture such as claimed in claim 11, having means to support the transverse screens independently of the bowl so that they remain in position when the bowl is lowered.

13. A luminaire for railway car lighting comprising a light source, an elongated diffusing bowl below the light source and having a generally rectangular shaped bottom area and upwardly extending side walls adapted for directional transmission of light and for concealing interior structures, an elongated reflector above the source and having its side walls extending substantially to the top of the highly translucent side walls of the bowl for directing light toward said bottom area and side walls with controlled spread transversely, the reflector having end walls to intercept high angled longitudinally directed light rays and reflect them toward the bottom of the bowl, and screen members extending upwardly from the ends of the bottom area with their upper edges inside and slightly below the lower edges of the ends of the reflector whereby a small amount of light may escape to illuminate the end portions of the bowl.

LEROY C. DOANE.